(12) United States Patent
Lindsay

(10) Patent No.: US 8,066,328 B2
(45) Date of Patent: Nov. 29, 2011

(54) VEHICLE SEAT LATCH STRIKER AND ASSIST HANDLE

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 12/405,274

(22) Filed: Mar. 17, 2009

(65) Prior Publication Data
US 2010/0237673 A1 Sep. 23, 2010

(51) Int. Cl.
*B60N 2/20* (2006.01)
(52) U.S. Cl. ............... 297/378.13; 296/65.17
(58) Field of Classification Search ............. 297/378.13; 296/66, 65.17
See application file for complete search history.

(56) References Cited

U.S. PATENT DOCUMENTS

| | | | |
|---|---|---|---|
| 2,038,033 A | | 4/1936 | Flynn |
| 5,741,046 A * | | 4/1998 | Leuchtmann et al. ... 297/378.13 |
| 6,340,189 B1 | | 1/2002 | Pordy |
| 6,811,199 B2 * | | 11/2004 | Nozaki ................. 297/378.13 X |
| 7,338,128 B2 * | | 3/2008 | Inoue et al. .............. 297/378.13 |
| 7,407,209 B2 | | 8/2008 | Stolarczyk et al. |
| 7,568,764 B2 * | | 8/2009 | Harper et al. ........ 297/378.13 X |
| 7,762,604 B1 * | | 7/2010 | Lindsay ................... 297/378.13 |
| 2004/0007909 A1 | | 1/2004 | Bonk |
| 2008/0174145 A1 | | 7/2008 | Saionji et al. |

FOREIGN PATENT DOCUMENTS

DE 10 2004 058 789 A1 6/2006
EP 0 965 484 B1 12/1999

* cited by examiner

*Primary Examiner* — Anthony D Barfield
(74) *Attorney, Agent, or Firm* — Rankin Hill & Clark LLP

(57) ABSTRACT

A vehicle includes a vehicle frame, a vehicle seat supported by the vehicle frame, and a striker connected to the vehicle frame. The vehicle frame defines a passenger ingress/egress opening. The vehicle seat includes a pivotal seat back movable between an upright and a collapsed position. The striker includes a handle grip positioned on the vehicle frame for gripping by an associated passenger entering or exiting the vehicle through the passenger ingress/egress opening. The striker is positioned on the vehicle frame to cooperate with the seat back to retain the seat back in the upright position. A vehicle seat is also disclosed.

27 Claims, 5 Drawing Sheets

VEHICLE SEAT LATCH STRIKER AND ASSIST HANDLE

BACKGROUND

The present disclosure generally relates to motor vehicles. More particularly, the present disclosure relates to a seat latch and an assist handle found in a vehicle.

Large vehicles, such as sport utility vehicles ("SUVs"), trucks, vans, minivans, crossovers and the like, include passenger assist handles for passenger ingress and egress. Typically, the assist handle connects to the vehicle frame near an ingress/egress passenger opening. The passenger grips the assist handle for support when exiting and entering the vehicle through the ingress/egress opening. These known assist handles only serve one purpose, i.e., to assist the passenger when entering and exiting the vehicle.

Many of the aforementioned vehicles also include folding, or collapsible, vehicle seats. These folding vehicle seats include a seat back that pivots between an upright and a collapsed position. The seat back is pivoted into the collapsed position to provide access to a seating area behind the folding seat or to provide access to a cargo area that is located behind the folding seat. The seat back houses a latch that cooperates with a striker connected to the vehicle frame or seat base. The latch latches to the striker to lock the seat back in the upright position. Most strikers used in vehicles include a horizontally oriented bar that cooperates with a latch. The striker serves only one purpose, i.e., to cooperate with the latch of the vehicle seat to lock the seat back in the upright position.

SUMMARY

An example of a vehicle that can integrate the features and/or functions of an assist handle and a striker includes a vehicle frame, a vehicle seat supported by the vehicle frame, and a striker connected to the vehicle frame. The vehicle frame defines a passenger ingress/egress opening. The vehicle seat includes a pivotal seat back movable between an upright and a collapsed position. The striker includes a handle grip positioned on the vehicle frame for gripping by an associated passenger entering or exiting the vehicle through the passenger ingress/egress opening. The striker is positioned on the vehicle frame to cooperate with the seat back to retain the seat back in the upright position.

An example of a vehicle seat includes a pivotal seat back, an extension, and a latch. The pivotal seat back moves between a latched and an unlatched position. The extension can project outwardly from a lateral outer edge of the seat back. The latch is supported on the extension. The latch is configured to cooperate with an associated striker for maintaining the seat back in the latched position.

Another example of a vehicle includes a vehicle frame, a vehicle seat supported by the vehicle frame, and a handle connected to the vehicle frame. The vehicle frame defines a passenger ingress/egress opening. The vehicle seat includes a pivotal seat back movable between a collapsed and an upright position. The handle is positioned on the vehicle frame for gripping by an associated passenger entering or exiting the vehicle through the passenger ingress/egress opening when the seat back is in the collapsed position. The handle is contacted by the seat back when the seat back is in the upright position.

DETAILED DESCRIPTION

Figure 1:
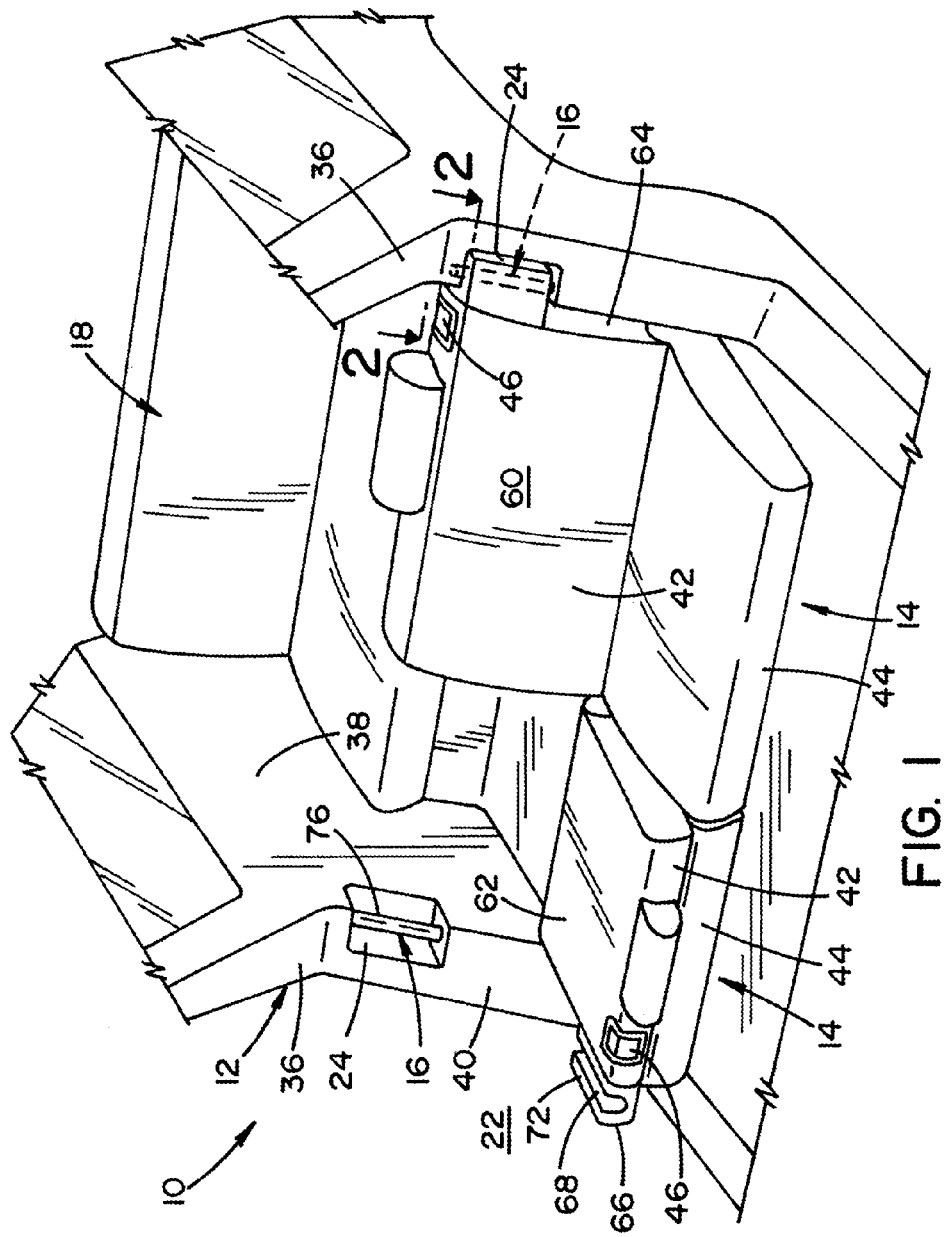
FIG. 1 is a perspective view of an interior of a vehicle including vehicle seats having a seat base and a fold-down seat back.

With reference to FIG. 1, a vehicle 10 is shown including a vehicle frame 12, a vehicle seat 14 supported by the vehicle frame and a striker 16 connected to the vehicle frame. More than one vehicle seat 14 and striker 16 are shown in the vehicle 10 (two of each are shown in the embodiment depicted in FIG. 1), though any number could be used in a vehicle. The forward vehicle seats 14 depicted in FIG. 1 can allow for a light-weight vehicle seat using a high-latch mechanism, which will be described in more detail below. For example, the vehicle 10 shown in FIG. 1 can be a three-row vehicle (the front seats are not shown in FIG. 1). For the vehicle 10 depicted in FIG. 1, this vehicle includes a third row of seats 18 depicted behind the fold-down seats 14. Alternatively, the fold-down seats 14 can be located elsewhere in the three-row vehicle, and other types of vehicles, e.g., one-row vehicles and two-row vehicles, can employ the embodiments discussed below. The striker 16 can be located in an advantageous position so that during ingress/egress by a passenger of the vehicle, the striker 16 is located in a useful position where it can operate as an assist handle to aid the passenger during ingress and egress and also locates the striker out of the usual path for ingress and egress. Accordingly, the striker 16 can also operate as an assist handle, and therefore may also be referred to as a handle.

The vehicle frame 12 defines a passenger ingress/egress opening 22, which is covered by a door (not shown) that can cover the passenger opening. This door can slide (translate) and/or pivot with respect to the frame 12. More particular to the depicted embodiment, the vehicle frame 12 also defines a cavity 24 (two are shown in FIG. 1) and the striker 16 is disposed in the cavity. The cavity 24 extends outwardly from the interior of the vehicle cabin. As more clearly seen in FIGS. 2 and 3, the cavity 24 of the illustrated embodiment includes a generally planar outer side wall 26 and a generally planar rear side wall 28. As more clearly seen in FIG. 5, the illustrated cavity 24 also includes a generally planar upper wall 32 and a generally planar lower wall 34 spaced from and vertically below the upper wall. In the depicted embodiment, the cavity 24 is generally block shaped taking the general form of a rectangular parallelepiped. In the depicted embodiment, the cavity 24 is disposed in a pillar 36 that forms part of the vehicle frame 12.

With reference back to FIG. 1, the vehicle 10 in the depicted embodiment includes an interior wall 38 and a transverse wall 40 that is at an angle to, generally perpendicular in FIG. 1, the interior wall 38 and forms a rear edge of the ingress/egress opening 22. The cavity 24 extends outwardly from the interior wall 38 and away from the interior cabin. The striker, or handle, 16 is offset outwardly from the interior wall 38 and rearwardly from the transverse wall 40. Such a location positions the striker 16 outside of the typical path a passenger would travel to sit on the rear seat 18 when entering the vehicle through the ingress/egress opening 22 with the fold-down seat 14 in the collapsed position.

The seats 14 and 18 are supported by the vehicle frame 12. More particular to the pivotal seats 14, these pivotal seats each include a pivotal seat back 42 and a base 44. The seat back 42 can move between at least two positions: an upright position and a collapsed position. The left forward vehicle seat 14 in FIG. 1 is shown in the collapsed position. The right forward vehicle seat 14 in FIG. 1 is shown in the upright position.

The fold-down vehicle seats 14 shown in FIG. 1 each include a movable lever 46 connected with a latch 48, an example of which is shown in FIGS. 2-5. The arrangement of the latch 48 on the seat back 42 can be referred to as a high-latch arrangement. A high-latch arrangement can provide a lightweight arrangement for holding the seat back 42 in a position for occupation and selective releasing of the seat back for access to a cargo area and/or ingress/egress to an area behind the seat back. High-latch arrangements result in an overall lightweight seat design because the seat can rely on the vehicle body 12 for cargo-retention strength and occupant loads in the event of a collision.

Figure 2:
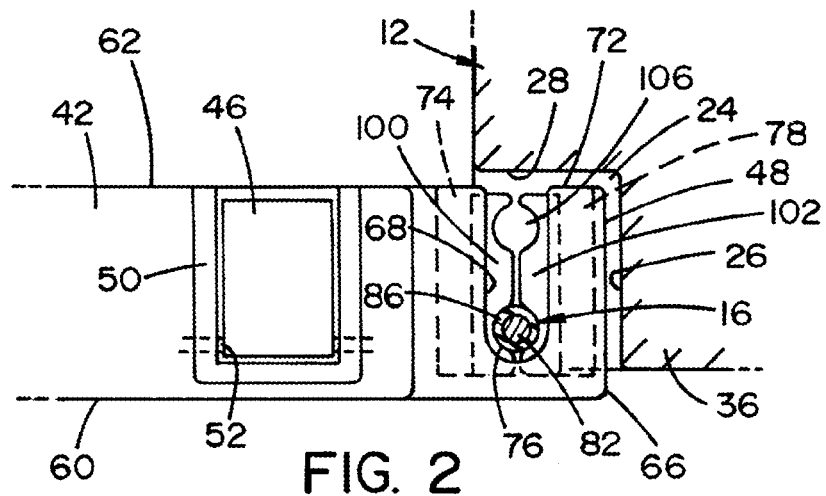
FIG. 2 is a cross-sectional view taken through line 2-2 in FIG. 1.

With reference to FIG. 2, the lever 46 can connect to a lever housing 50 via an axle or pin 52, which allows the lever 46 to rotate about a rotational axis defined by the axle. The lever 46 is operatively connected to the latch 48 through a linkage (not shown) such that movement of the lever 46 results in movement of the latch 48, in a manner that will be discussed in more detail below.

With reference back to FIG. 1, the pivotal seat back 42 includes a front side 60 and a rear side 62. Each fold-down seat 14 also includes a lateral outer edge 64. The latch 48 mounts on the fold-down vehicle seat 14, more particularly on the pivotal seat back 40 of the vehicle seat. More particular to the depicted embodiment, the pivotal seat 14 includes an extension 66 that extends outwardly from the lateral outer edge 64 at an upper shoulder region of the vehicle seat. As seen in FIGS. 2-5, for the depicted embodiment, the latch 48 is housed in and/or connected with the extension 66.

The extension 66 is generally block shaped and is configured to be conformably received in the cavity 24 formed in the vehicle frame 12 when the seat back 42 is in the upright position. In other words, the extension 66 is at least partially received within the cavity 24 when the seat back 42 is in the upright, or latched, position (see FIGS. 2 and 3). Accordingly, the extension 66 can have a generally rectangular parallelepiped configuration. The extension 66 includes an elongate channel 68 formed in a rear surface 72 of the extension, which is flush with the rear surface 62 of the pivotal seat back 42. The elongate channel 68 is generally U-shaped in a cross section taken normal to a longest dimension of the channel. The elongate channel 68 is configured to receive the striker 16 when the seat back 40 is in the upright position.

Figure 4:
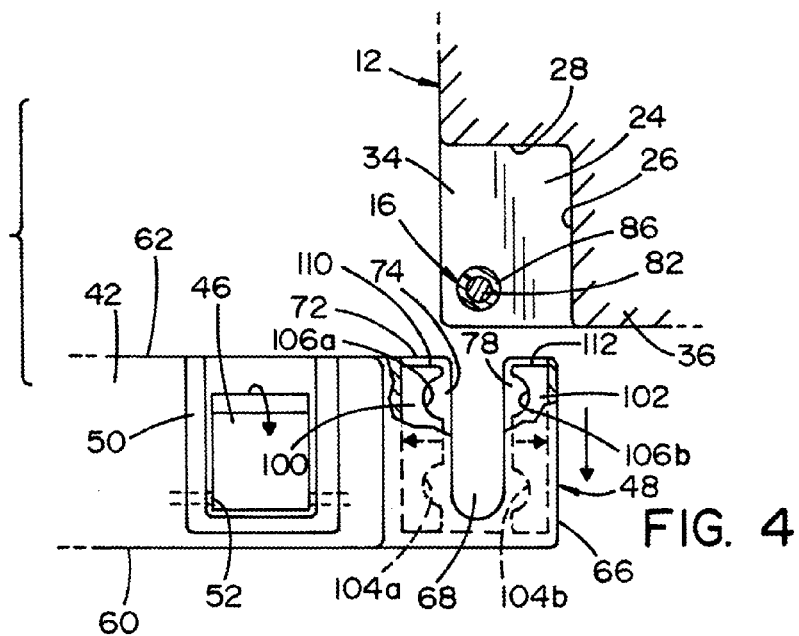
FIG. 4 is a cross-sectional view similar to the views shown in FIGS. 2 and 3, with the fold-down seat back disengaged from the striker. A portion of the seat back is shown broken away.
Figure 5:
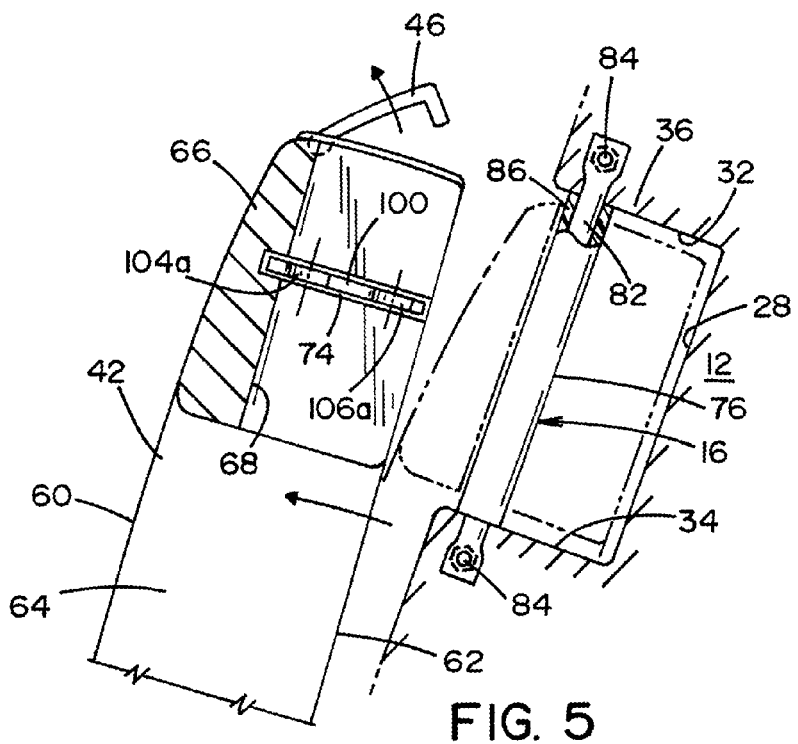
FIG. 5 is a side view, partially in cross section, of the vehicle seat back disengaged from the striker.

With reference to FIG. 5, a transverse notch 74 is formed in the extension 66. A second transverse notch 78 (FIG. 4) is disposed on an opposite side of the elongate channel 68. These notches 74 receive a component of the latch 48, which will be described in more detail below. These notches 74 open to the elongate channel 68 to allow the latch 46 to cooperate with the striker 16, in a manner that will be described in more detail below.

As mentioned above, the striker 16 connects to the vehicle frame 12. In the depicted embodiment, the striker 16 includes a handle grip 76 positioned with respect to the vehicle frame 12 for gripping by a passenger entering or exiting the vehicle through the passenger ingress/egress opening 22. The striker 16 is also positioned on the vehicle frame 12 to cooperate with the seat back 40 to retain the seat back in an upright position. Since the striker 16 includes the handle grip 76, the striker can operate as both a grip or assist handle for a passenger entering or exiting the vehicle and as a striker for cooperating with the vehicle seat 14. Accordingly, the striker, or handle, 16 provides a dual function. The handle 16 can be contacted by the seat back 42 when the seat back is in the upright position.

With reference to FIG. 2, the striker 16, or handle, includes a rigid rod 82 connected with the vehicle frame 12 (see FIG. 5). FIG. 5 depicts fasteners 84 for attaching the rod 82 to the vehicle frame 12. Other manners of attachment can be used (e.g. welding). The handle 16 can also include a plastic material 86 covering at least a portion of the rigid rod 82. In the depicted embodiment, the plastic material 86 can be nylon to prevent marring of the handle surface when the latch 48 contacts the handle. The striker 16 in the depicted embodiment is elongated in the vertical direction. With reference to FIG. 5, the handle grip 76 of the striker 16 is the vertically oriented section and in the depicted embodiment is longer than about eight centimeters. Also, the upper wall 32 of the cavity 24 is vertically spaced from the lower wall 34 at least about eight centimeters. Accordingly, the handle grip 76 of the striker 16 is long enough to be easily grasped by an adult who is entering and exiting the vehicle through the passenger ingress/egress opening 22. Also, the cavity 24 is large enough to accommodate an adult's hand to grasp the handle grip 76.

Figure 3:
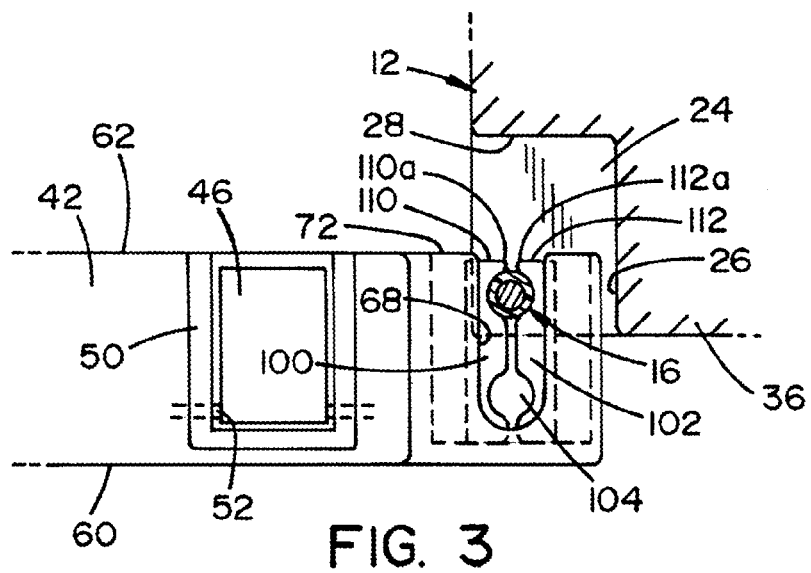
FIG. 3 is a cross-sectional view similar to that shown in FIG. 2 showing the fold-down seat back in a different upright position than the upright position shown in FIG. 2.

With reference to FIGS. 2 and 3, the striker 16 is located forwardly from the rear wall 28 of the cavity 24 that receives the striker and inwardly from the outer wall 26 of the cavity. Accordingly, the striker 16 is located adjacent an inner and forward corner of the cavity 24 formed in the vehicle frame 12. Such a location allows for the extension 66 to be accommodated within the cavity 24 when the seat back 42 is in the upright position. Also, this locates the striker 16 out of the path traveled by the passenger to access the rear seat 18.

As seen when comparing FIG. 2 to FIG. 4, movement of the lever 46 results in movement of the latch 48. The latch 48 includes at least one movable latch body including a recess for receiving the striker 16. The at least one movable latch body can include at least one clamping element defining at least one recess. The at least one recess, an example of which is discussed in more detail below, is configured to engage the striker 16, which is elongated in a vertical direction.

More particular to the embodiment disclosed in FIGS. 2-5, the latch 48 includes a first clamping element, or movable latch body, 100 and a second clamping element, or movable latch body, 102. The latch 48 of the illustrated embodiment in FIGS. 2-5 also includes at least two recesses each being configured to receive the striker 16, though this is not required. More particular to the embodiment illustrated in FIGS. 2-5, the latch 48 includes a first (forward) recess 104 (FIG. 3) that is forwardly disposed from a second (rearward) recess 106 (FIG. 2). In other words, the latch 48 includes at least two recesses 104, 106, each configured to receive the striker 16. A first recess 104 of the at least two recesses 104, 106 can be forwardly spaced from a second recess 106 of the at least two recesses. The recesses 102 and 104 in the depicted embodiment are generally circular.

The first clamping element 100 and the second clamping element 102 are each disposed in a respective transverse slot. As seen in FIG. 5, the first clamping element 100 is movable into and out of the first transverse slot 74. The second clamping element 102 is also movable in and out of the second transverse slot 78. The first clamping element 100 and the second clamping element 102 can be biased toward each other. The clamping elements 100 and 102 of the embodiment illustrated in FIGS. 2-5 are mirror images of each other. The clamping elements 100, 102 can be made from a thin rigid bar, which can be made of metal, for example.

As more clearly seen in FIG. 4, the first clamping element 100 can define a first (forward) recess 104a and a second (rearward) recess 106a. Similarly, the second clamping element 102 can define a first (forward) recess 104b and a second (rearward) recess 106b. When the latch 48 is in a closed or latched position (as shown in FIGS. 2 and 3) the respective forward recesses 104a and 104b make up the forward recess 104 and the respective rearward recesses 106a and 106b make up the rearward recess 106. The recesses 104a, 104b, 106a, 106b in each respective clamping member 100, 102 are semicircular, or C-shaped, to accommodate the circular cross section of the striker 16. These recesses can take alternative configurations, especially where the striker 16 takes an alternative configuration.

As seen when comparing FIG. 2 to FIG. 3, the seat back 42 is movable to multiple recline positions, such as between a first upright latched position (FIG. 3) and a second upright latched position (FIG. 2). The striker 16 is received in the first recess 104 when the seat back 42 is in the first upright position (FIG. 3). The striker 16 is received in the second recess 106 when the seat back 42 is in the second upright position (FIG. 2). More than two recesses can be provided in the latch 48 or the clamping elements 100, 102 so that the seat back 42 can reside in more than two upright, latched, positions (e.g. recline positions).

To unlatch the seat back 42 so it can be moved into the collapsed position, an operator pulls the lever 46 so that it moves about the axle 52, thus moving the clamping elements 100 and 102 away from one another, which is shown in FIG. 4. The lever 46 and/or the latch 48 can be biased toward the closed position (FIGS. 2 and 3) so that removal of the force by the operator on the lever results in the clamping elements 100 and 102 moving toward one another to the position similar shown in FIGS. 2 and 3.

With reference to FIG. 3, the first clamping element 100 includes a rearward edge 110 and the second clamping element 102 also includes a rearward edge 112. These rearward edges 110, 112 can each have a slightly chamfered internal corner 110a, 112a, respectively (with respect to the elongate channel 68) so that when the seat back 42 is moved from the collapsed position to engage the striker 16, the chamfered corners 110a, 112a contact the striker 16 and the striker pushes outwardly against these chamfered corners prior to being seated into the rearward recess 106. To further recline the seat back 42 from the position shown in FIG. 3 to the position shown in FIG. 2, the operator would pull on the lever 46 disengaging the latch 48 from the striker 16 and push the seat rearward where the striker would rest in the forward recess 104.

Figure 6:
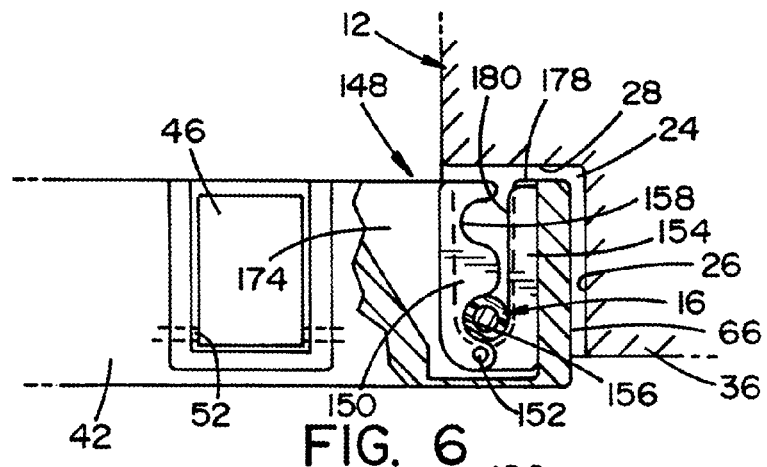
FIG. 6 depicts a partial cross-sectional view, similar to that shown in FIGS. 2-4, of an alternative embodiment of a latch with the seat back in an upright, latched, position.
Figure 7:
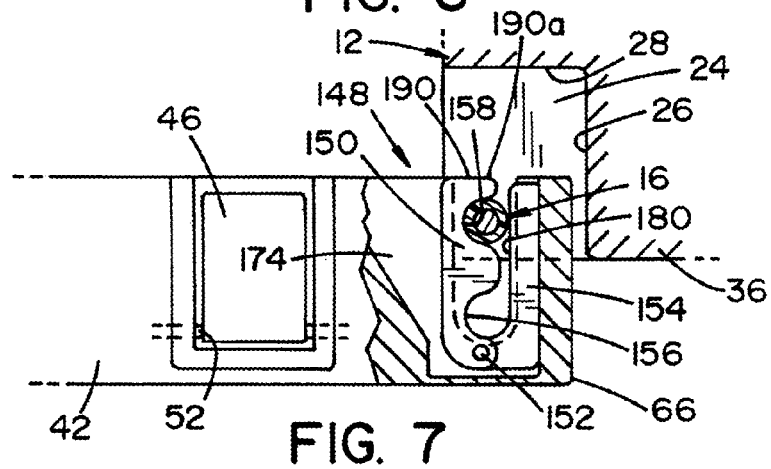
FIG. 7 depicts a partial cross-sectional view of the latch shown in FIG. 6, but in a different upright, latched, position.
Figure 8:
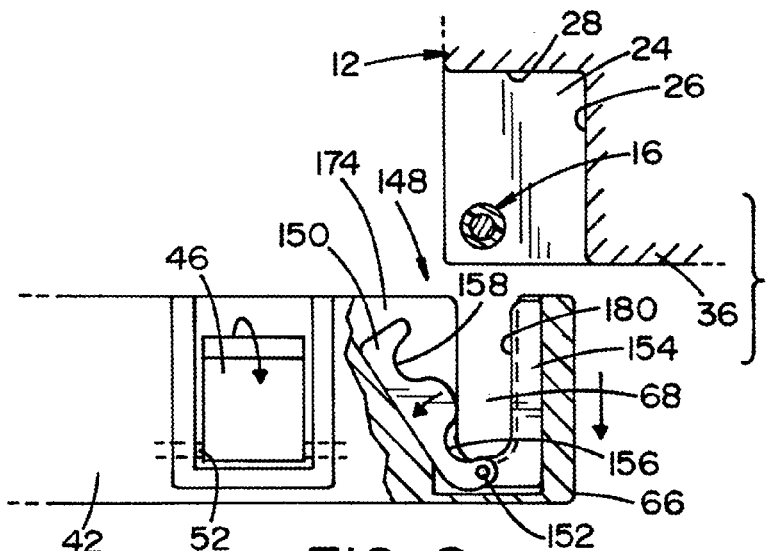
FIG. 8 depicts a partial cross-sectional view of the latch shown in FIG. 6 with the vehicle seat back disengaged from the striker.

FIGS. 6-8 depict an alternative embodiment of a latch 148. The latch 148 includes at least one movable latch body 150, which can also be referred to as a movable clamping element. More particular to the embodiment illustrated in FIGS. 6-8, the latch 148 includes the movable latch body 150, an axle, or pin 152, and a fixed body 154. The movable latch body 150 pivots about an axis that is concentric with the axle 152. Movement of the lever 46 results in the movable latch body 150 pivoting away from the fixed body 154 to disengage the striker 16 (see FIG. 8). The lever 46 and/or the latch 148 can be biased toward the closed position (shown in FIGS. 6 and 7) so that removal of the force by the operator on the lever results in the movable latch body 150 pivoting toward the fixed body 154 into the closed position.

The latch 148 in the embodiment illustrated in FIGS. 6-8 also includes at least two recesses (more than two or less than two recesses can be provided). Each recess is configured to receive the striker 16. The movable latch body 150 depicted in FIGS. 6-8 includes a first (forward) recess 156 (FIG. 7) that is forwardly disposed from a second (rearward) recess 158 (FIG. 6). The recesses 156 and 158 are shaped to receive the striker 16. The striker contacts the movable latch body 150 and the fixed latch body 154 when received in either recess.

The movable latch body 150 and the fixed latch body 154 are each disposed in a respective transverse slot formed in the extension 66 that each open into the elongate channel 68 (FIG. 8). As seen when comparing FIG. 6 to FIG. 8, the movable latch body 150 is movable into and out of a first transverse slot 174. The fixed body 154 is received in the second transverse slot 178 and is fixed, i.e. does not move, with respect to the extension 66. The movable latch body 150 can be biased toward the fixed body 154.

The movable latch body 150 and the fixed latch body 154 can each be made from a thin rigid bar, which can be made of metal, for example. In the embodiment depicted in FIGS. 6-8, the movable latch body 150 is shown including the recesses 156 and 158 and the fixed body 154 is shown having a straight internal edge 180 that is parallel to a straight edge of the elongate channel 68.

As seen when comparing FIG. 6 to FIG. 7, the seat back 42 is movable to multiple recline positions such as between a first upright latched position (FIG. 7) and a second upright latched position (FIG. 6). The striker 16 is received in the first recess 156 when the seat back 42 is in the first upright position. The striker 16 is received in the second recess 158 when the seat back 42 is in the second upright position. As mentioned above, more than two recesses can be provided in the movable latch body 150 so that the seat back 42 can reside in more than two upright, latched, positions.

With reference to FIG. 7, the movable latch body 150 includes a rearward edge 190 that can each have a slightly chamfered internal corner 190a, (with respect to the elongate channel 68) so that when the seat back 42 is moved from the collapsed position to engage the striker 16, the chamfered corner 190a contacts the striker 16 and the striker pushes outwardly against these chamfered corner prior to being seated into the rearward recess 158. To unlatch the seat back 42 so that it can be moved into the collapsed position, an operator pulls the lever 46 (see FIG. 8) so that it moves about the axle 52, thus pivoting the movable latch body 150 away from the fixed latch body 154 into the transverse slot 174. To recline the seat back 42 from the position shown in FIG. 7 to the position shown in FIG. 6, the operator would pull the lever 46 disengaging the latch 148 from the striker and push the seat rearward where the striker would rest in the forward recess 156.

Figure 9:
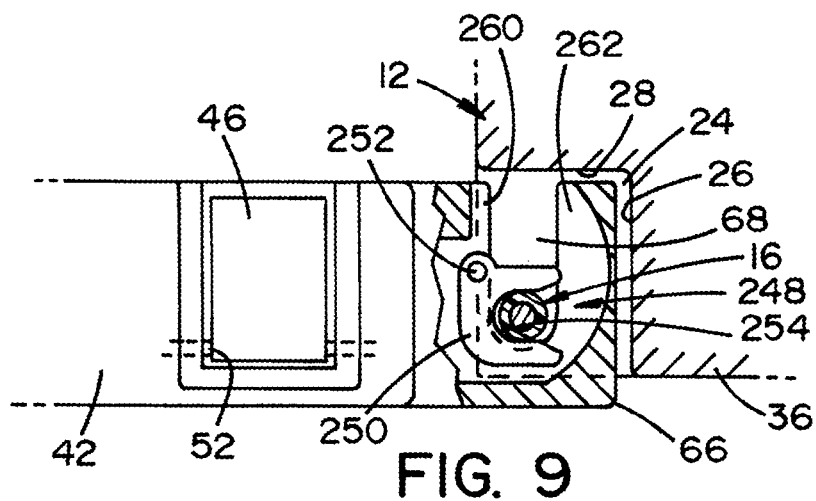
FIG. 9 depicts a partial cross-sectional view of another alternative embodiment of a latch with the seat back in a latched, upright, position.
Figure 10:
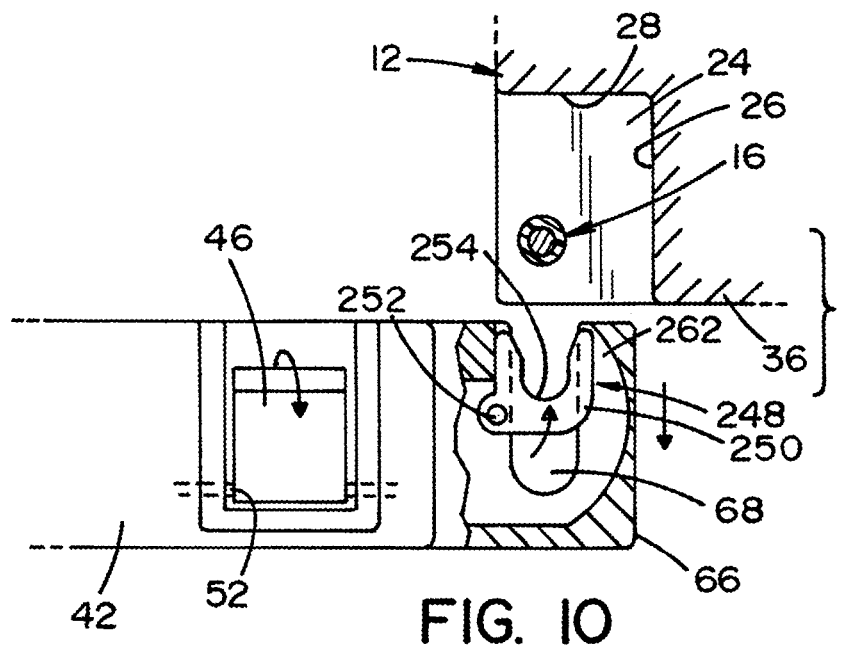
FIG. 10 depicts a partial cross-sectional view of the latch shown in FIG. 9 with the seat back disengaged from the striker.

With reference to FIGS. 9 and 10, an alternative embodiment of a latch 248 is shown. The latch 248 in this illustrated embodiment includes a movable latch body 250 and a pin, or axle, 252. The movable latch body 250 is operated by the lever 46 in a manner that will be described in more detail below. The latch 248 can be connected with and/or housed in the extension 66.

The movable latch body 250 includes a U-shaped recess 254 that aligns with the elongate channel 68 formed in the extension 66 when the movable latch body 250 is shown in a first (unlatched) operating position (FIG. 10). To latch the seat back 42 to the striker 16, an operator pushes the seat back 42 toward the striker so that the striker is received in the elongate channel 68 formed in the extension 66. As the seat back 42 moves further toward the upright position, the striker 16 is eventually received in the U-shaped recess 254 and bottoms out in this recess, which results in the movable latch body 250 rotating in a clockwise direction (compare FIG. 10 to FIG. 9). In other words, the movable latch body 250 pivots toward a locked position when contacted by the striker. Alternatively, the pin 252 could be located on an opposite side and the movable latch body 250 could rotate in the counterclockwise direction.

To disengage the striker 16 from the latch 248, an operator would pull the lever 46 resulting in rotation of the movable latch body 250 in a counterclockwise direction (per the embodiment depicted in FIGS. 9 and 10). This would allow the seat back 42 to be moved from the upright, latched, position, which is shown in FIG. 9, toward the collapsed position because the U-shaped recess 254 would be aligned with the elongate channel 68 in the extension 66.

The extension 66 in the embodiment depicted in FIGS. 9 and 10 also includes transverse slots 260 and 262 formed on opposite sides of the elongate channel 68. The transverse slots 260 and 262 open to the elongate channel 68 and each receive the movable latch body 250. The movable latch body 250 pivots into the first transverse slot 260 when moving into the latched position (FIG. 9) and pivots into the second transverse slot 262 when moving into the unlatched position (FIG. 10).

A seat latch and striker, which can also operate as an assist handle, have been described with reference to particular embodiments. A vehicle and vehicle seat have also been described in detail above. Modifications and alterations will occur to those skilled in the art upon reading and understanding the preceding detailed description. The invention is not limited to only those embodiments described above. Instead, the invention is broadly defined by the appended claims and the equivalents thereof.

The invention claimed is:

1. A vehicle comprising:
a vehicle frame defining a passenger ingress/egress opening, wherein the vehicle frame defines a cavity extending outwardly from an interior cabin of the vehicle;
a vehicle seat supported by the vehicle frame, the vehicle seat including a pivotal seat back movable between an upright and a collapsed position, wherein the vehicle seat includes an extension that extends outwardly from an upper shoulder region of the vehicle seat;
a striker disposed in the cavity and connected to the vehicle frame, the striker including a handle grip positioned on the vehicle frame for gripping by an associated passenger entering or exiting the vehicle through the passenger ingress/egress opening, the striker being positioned on the vehicle frame to cooperate with the seat back to retain the seat back in the upright position; and
a latch mounted on the vehicle seat, wherein the latch engages with the striker to retain the seat back in the upright position and the latch is housed in the extension.

2. The vehicle of claim 1, wherein the extension is at least partially received within the cavity when the seat back is in the upright position.

3. The vehicle of claim 1, wherein the latch includes at least two recesses, each configured to receive the striker.

4. The vehicle of claim 3, wherein a first recess of the at least two recesses is forwardly spaced from a second recess of the at least two recesses.

5. The vehicle of claim 3, wherein the seat back is movable between a first upright latched position and a second upright latched position, the striker being received in a first recess of the at least two recesses when the seat back is in the first upright position and the striker being received in a second recess of the at least two recesses when the seat back is in the second upright position.

6. The vehicle of claim 1, wherein the latch includes at least one movable latch body including a recess for receiving the striker.

7. The vehicle of claim 6, wherein the at least one movable latch body includes a first clamping element and a second clamping element, each clamping element including a recess.

8. The vehicle of claim 6, wherein the at least one movable latch body includes a movable clamping element and a fixed body, wherein the movable clamping element includes at least two recesses.

9. The vehicle of claim 6, wherein the at least one movable latch body pivots toward a locked position when contacted by the striker.

10. A vehicle seat comprising:
a pivotal seat back movable between a latched and an unlatched position;
an extension projecting outwardly from a lateral outer edge of the seat back; and
a latch supported on the extension, the latch being configured to cooperate with an associated striker for maintaining the seat back in the latched position, wherein the latch includes at least one clamping element defining a first recess and a second recess, each recess being configured to engage a striker that is elongated in a vertical direction.

11. The vehicle seat of claim 10, wherein the at least one clamping element includes a first clamping element and a second clamping element, at least one of the clamping elements defining the first recess and the second recess.

12. The vehicle seat of claim 11, wherein the first clamping element and the second clamping element are biased toward each other.

13. The vehicle seat of claim 10, wherein the first recess is forwardly disposed from the second recess.

14. The vehicle seat of claim 10, wherein the extension projects outwardly from an upper shoulder region of the vehicle seat.

15. A vehicle comprising:
a vehicle frame defining a passenger ingress/egress opening, wherein the vehicle frame defines a cavity;
a vehicle seat supported by the vehicle frame, the vehicle seat including a pivotal seat back movable between a collapsed and an upright position, wherein the vehicle seat includes an extension that extends outwardly from an upper shoulder region of the vehicle seat, the extension being at least partially received within the cavity when the seat back is in the upright position; and
a handle disposed in the cavity and connected to the vehicle frame, the handle positioned on the vehicle frame for gripping by an associated passenger entering or exiting the vehicle through the passenger ingress/egress opening when the seat back is in the collapsed position.

16. The vehicle of claim 15, wherein the vehicle seat includes a latch configured to cooperate with the handle to maintain the seat back in the upright position.

17. The vehicle of claim 16, wherein the latch is housed in the extension.

18. The vehicle of claim 15, wherein the vehicle includes an interior wall and the cavity extends outwardly from the interior wall.

19. The vehicle of claim 18, wherein the handle is offset outwardly from the interior wall.

20. The vehicle of claim 15, wherein the handle includes a rigid rod connected with the vehicle frame and a plastic covering over at least a portion of the rigid rod.

21. The vehicle of claim 15, wherein the seat back engages the handle in at least two upright positions.

22. The vehicle of claim 15, wherein the handle is contacted by the seat back when the seat back is in the upright position.

23. A vehicle comprising:
   a vehicle frame defining a passenger ingress/egress opening;
   an interior wall connected with the vehicle frame and defining a cavity extending outwardly from the interior wall; and
   a vehicle seat supported by the vehicle frame, the vehicle seat including a pivotal seat back movable between a collapsed and an upright position, wherein the vehicle seat includes an extension that extends outwardly from a lateral outer edge at an upper shoulder region of the vehicle seat, the extension being at least partially received within the cavity when the seat back is in the upright position.

24. The vehicle of claim 23, further comprising a handle disposed in the cavity and connected to the vehicle frame.

25. The vehicle of claim 24, wherein the vehicle seat includes a latch configured to cooperate with the handle to maintain the seat back in the upright position.

26. A vehicle comprising:
   a vehicle frame defining a passenger ingress/egress opening;
   a vehicle seat supported by the vehicle frame, the vehicle seat including a pivotal seat back movable between an upright and a collapsed position;
   a striker connected to the vehicle frame, the striker including a handle grip for gripping by an associated passenger entering or exiting the vehicle through the passenger ingress/egress opening, the striker being positioned to cooperate with the seat back to retain the seat back in the upright position; and
   a latch mounted on the vehicle seat, wherein the latch engages with the striker to retain the seat back in the upright position, wherein the latch includes a first clamping element and a second clamping element, each clamping element including a recess for receiving the striker.

27. A vehicle comprising:
   a vehicle frame defining a passenger ingress/egress opening;
   a vehicle seat supported by the vehicle frame, the vehicle seat including a pivotal seat back movable between an upright and a collapsed position;
   a striker connected to the vehicle frame, the striker including a handle grip for gripping by an associated passenger entering or exiting the vehicle through the passenger ingress/egress opening, the striker being positioned to cooperate with the seat back to retain the seat back in the upright position; and
   a latch mounted on the vehicle seat, wherein the latch engages with the striker to retain the seat back in the upright position, wherein the latch includes a movable clamping element and a fixed body, wherein the movable clamping element includes at least two recesses for receiving the striker.

* * * * *